United States Patent [19]
Christensen

[11] Patent Number: 5,927,335
[45] Date of Patent: *Jul. 27, 1999

[54] SPHERICAL CHAMBER FLUIDIC BALL DIVERTER VALVE

[75] Inventor: Donald Jeffrey Christensen, Phoenix, Ariz.

[73] Assignee: AlliedSignal Inc., Morristown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/852,647

[22] Filed: May 7, 1997

[51] Int. Cl.$^6$ .................................................... F15C 1/04
[52] U.S. Cl. .......................... 137/821; 137/804; 137/831; 137/833; 137/876; 137/899.2; 244/3.22
[58] Field of Search ..................................... 137/819, 821, 137/833, 831, 834, 840, 804, 805, 872, 876, 899.2; 251/315.07; 244/3.22

[56] References Cited

U.S. PATENT DOCUMENTS

| | | | |
|---|---|---|---|
| 3,486,517 | 12/1969 | Gaura ....................................... | 137/872 |
| 3,516,638 | 6/1970 | Piggot . | |
| 3,520,479 | 7/1970 | Jacquin et al. ........................... | 137/831 |
| 3,521,653 | 7/1970 | Becker . | |
| 3,612,442 | 10/1971 | Chisel .................................... | 244/3.22 |
| 3,726,496 | 4/1973 | Leornard ................................. | 244/3.22 |
| 3,740,003 | 6/1973 | Ayre et al. .............................. | 244/3.22 |
| 3,877,486 | 4/1975 | Merrell et al. .......................... | 137/831 |
| 3,984,071 | 10/1976 | Fleming .................................. | 244/3.22 |
| 4,173,234 | 11/1979 | Thomas et al. . | |
| 4,202,517 | 5/1980 | Young et al. ........................... | 244/3.22 |
| 4,413,795 | 11/1983 | Ryan ...................................... | 244/3.22 |
| 4,635,674 | 1/1987 | Bajka . | |
| 4,716,936 | 1/1988 | Mon et al. .............................. | 137/833 |

FOREIGN PATENT DOCUMENTS 19 31 837  1/1971  Germany .

*Primary Examiner*—A. Michael Chambers
*Attorney, Agent, or Firm*—Robert Desmond, Esq.

[57] ABSTRACT

A fluidic ball diverter valve for use in aerospace applications for diverting the output of a fluidic amplifier comprises a valve chamber having an inlet and two outlets. The orientation of the outlet valve seats is such that a line of action between the valve seats passing through the center of the valve ball defines an angle less 180 degrees. The orientation of the outlet valve seats permits the entire laminated fluidic amplifier module and at least a portion of the ball diverter valve itself to be mounted within the pressure vessel of the gas generator itself. By moving these components inside the pressure vessel, the pressure differential experienced by the components is substantially less than if the components were mounted outside the pressure vessel. This permits the components to be of substantially lighter construction.

17 Claims, 5 Drawing Sheets

5,927,335

SPHERICAL CHAMBER FLUIDIC BALL DIVERTER VALVE

TECHNICAL FIELD

This application relates to valves in general and in particular to fluidic ball diverter valves.

BACKGROUND OF THE INVENTION

Fluidic ball diverter valves are frequently used in missile and space vehicle flight control systems that use reaction jets to control the pitch, yaw, spin rate and other dynamics of a vehicle in flight. In such a flight control system, output from a gas generator or other pressure source is directed into a fluidic amplifier. In response to a control signal provided by the flight control electronics, the fluidic amplifier diverts the gas output into one of two gas paths leading to a pair of nozzles positioned on the outside of the vehicle. One gas path leads to a nozzle having an output to provide a force in one direction. The other gas path leads to a nozzle having an output in the opposite direction. By diverting the gas generator output to one or the other of the two nozzles, the fluidic amplifier provides a positive or negative acceleration affecting the particular flight parameter. Because a pyrotechnic gas generator typically cannot be shut off once initiated, if no change in the flight parameter is dictated by the flight control electronics, the fluidic control system simply oscillates the gas generator output back and forth between the two opposing nozzles. Preferably, the rate of oscillation between the two nozzles is fast enough that the gross body acceleration of the vehicle does not change. To accomplish this, it is not unusual for a fluidic flight control system to change the flow from one nozzle to the other at a rate of 200 times per second or faster.

Design considerations such as the need to minimize the size and weight of the gas generator dictate that non-vented fluidic elements be used to control the gas generator output. Vented fluidic elements have high flow diversion capability, however, they also have a vented reaction zone that would result in a substantial portion of the gas generator output being discharged through an uncontrolled exhaust port. Non-vented fluidic amplifiers do not require a vented reaction region, however, they have a disadvantage in that they are incapable of providing 100% flow diversion. Thus, it is necessary to incorporate an additional device, such as a fluidic ball diverter valve, between the final stage fluidic amplifier and the output nozzles in order to achieve 100% flow diversion. Prior art ball diverter valves are generally constructed by boring a cylindrical chamber into the fluidic amplifier module so that the chamber communicates with both output legs of the fluidic amplifier. After the ball is inserted into the chamber, the ends of the chamber are sealed with caps carrying the ball seats. Although the prior art fluidic ball diverter valves generally achieve the required 100% flow diversion, the prior art valves are heavy and difficult to assemble. The fluidic amplifier module is typically an assembly of individual fluidic element laminae bonded together. Accordingly, prior art fluidic ball diverter valves are prone to failure caused by delamination of the cylindrical ball chamber under the high temperature and pressure of the gas generator output; and since the valve seats are oriented 180° apart, the prior art valves cannot be imbedded within the pressure vessel of the gas generator and, therefore, must be designed to withstand the full gas generator pressure.

What is needed is a gas generator control system incorporating a fluidic ball diverter valve that is compatible with conventional fluidic amplifier elements, yet does not have the cost and weight disadvantages inherent in a cylindrical chamber bored into a laminated fluidic amplifier assembly.

SUMMARY OF THE INVENTION

A ball diverter valve constructed in accordance with principals of the present invention comprises a valve chamber having an inlet and two outlets. The orientation of the outlet valve seats is such that a line of action between the valve seats passing through the center of the valve ball defines an angle less 180 degrees. The orientation of the outlet valve seats permits the entire laminated fluidic amplifier module and at least a portion of the ball diverter valve itself to be mounted within the pressure vessel of the gas generator itself. By moving these components inside the pressure vessel, the pressure differential experienced by the components is substantially less than if the components were mounted outside the pressure vessel. This permits the components to be of substantially lighter construction.

BRIEF DESCRIPTION OF THE DRAWINGS

The present invention will be better understood from a reading of the following detailed description, taken in conjunction with the accompanying drawing figures in which like references designate like elements and, in which.

DESCRIPTION OF THE PREFERRED EMBODIMENT

Figure 1:
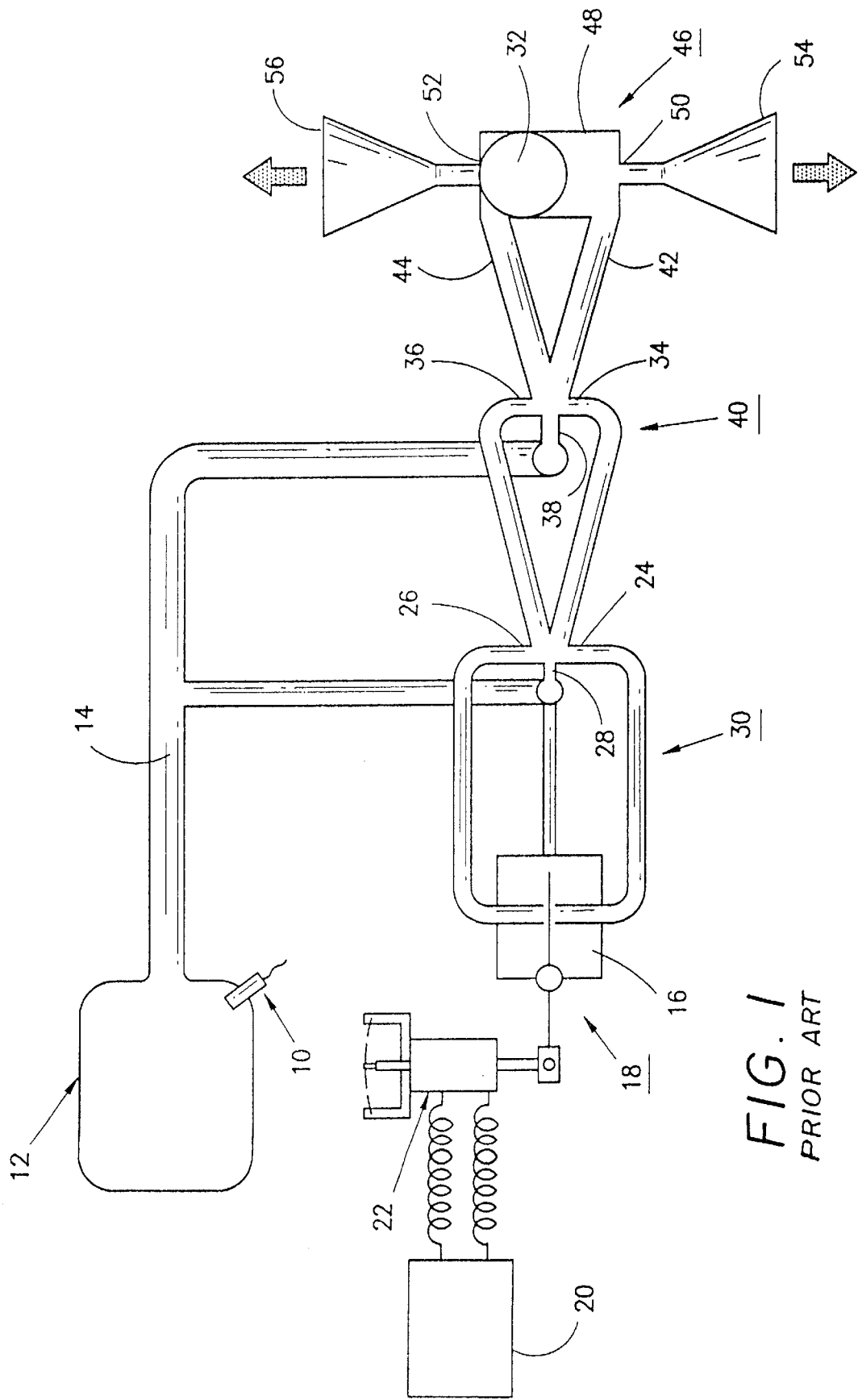
FIG. 1 is a schematic of a flight control system incorporating a prior art ball diverter valve.

The drawing figures are intended to illustrate the general manner of construction and are not necessarily to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

FIG. 1 is a schematic diagram of a fluidic flight control system of the prior art. At an appropriate time during the launch sequence or later in the flight of the vehicle, initiator 10 initiates a gas generator 12 which provides a combustion output of high pressure, high temperature gas. A portion of the gas output of gas generator 12 is conveyed through a gas path 14 to a reaction zone 16 of a pilot valve 18. In response to a signal from flight electronics 20, a solenoid 22 diverts the flow from reaction zone 16 into one of two control jets 24 and 26 of a non-vented fluidic bistable amplifier 30. A second portion of the gas output is conveyed through gas path 14 to the primary jet 28 of amplifier 30. In response to the output of the control jets 24 and 26, the second portion of gas is diverted into one of two control jets 34 and 36 of a second stage non-vented fluidic bistable amplifier 40. The remainder of the gas output of gas generator 12 is conveyed through gas path 14 to the primary jet 38 of amplifier 40 where, in response to the output of the control jets 34 and 36, it is diverted into one of two output gas paths 42 and 44. Output gas paths 42 and 44 of amplifier 40 are in fluid communication with ball diverter valve 46. Output gas paths 42 and 44 ultimately lead to the thrust nozzles 54 and 56. Typically, thrust nozzles 54 and 56 are oriented so that if equal thrust were delivered by each nozzle, the output of nozzle 54 would cancel the effect of nozzle 56 and vice versa. For example, if nozzles 54 and 56 are for pitch control, if nozzle 54 were aimed down, nozzle 56 would be aimed up. If nozzles 54 and 56 were for yaw control, if nozzle 54 were aimed left, nozzle 56 would be aimed right.

The flow diversion capability of the non-vented amplifiers 30 and 40 are less than 100% and may be as low as 70%. Accordingly, when the flight electronics signal for the output to be diverted into output gas path 42, up to 30% of the output will still enter gas path 44. A 30% negative thrust exiting the control jet 54 opposing the positive thrust exiting jet 56 would result in a net thrust equal to only 40% of the maximum theoretical thrust, thereby necessitating that gas generator 12 have over twice the capacity as would be required in a system capable of 100% flow diversion. Vented fluidic amplifiers have greater flow diversion capability than unvented amplifiers, however, vented amplifiers require a portion of the fluid flow be exhausted through the uncontrolled vent, resulting in even greater inefficiencies.

The flow diversion limitations of the unvented fluidic control elements are solved in the prior art embodiment shown by incorporation of a fluidic ball diverter valve 46 between output gas paths 42 and 44 and the thrust nozzles 54 and 56. Ball diverter valve 46 comprises a ball 32 within a cylindrical ball chamber 48 opening to output gas paths 42 and 44. Ball seats 50 and 52 are located at opposite ends of cylindrical chamber 48 to provide a surface against which ball 32 can seal. In response to the pressure differential between output gas paths 42 and 44 produced by amplifier 40, ball 32 moves back and forth against either seat 50 of seat 52. As shown in FIG. 1, ball 32 is seated against seat 52 and in cooperation with seat 52 completely closes the gas path leading to thrust nozzle 56, thereby providing 100% flow diversion to thrust nozzle 54. Similarly, in response to an opposite pressure signal from amplifier 40, ball 32 moves against seat 50 and, in cooperation with seat 50 closes the gas path to thrust nozzle 54, thereby providing 100% flow diversion to thrust nozzle 56.

Figure 3:
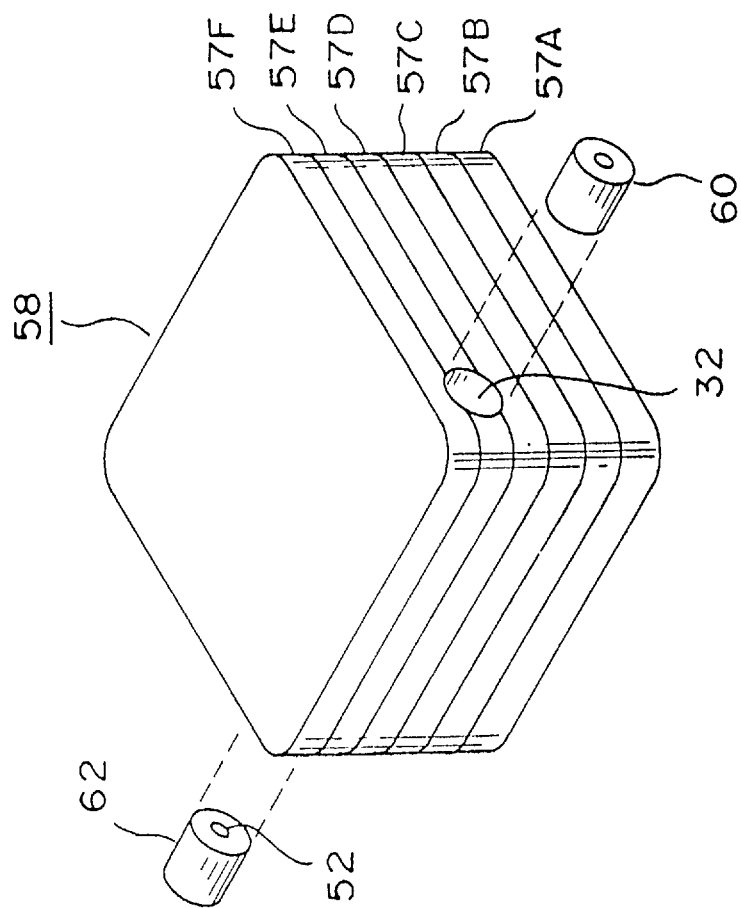
FIG. 3 is a perspective view of a fluidic amplifier module incorporating a prior art ball diverter valve.
Figure 2:
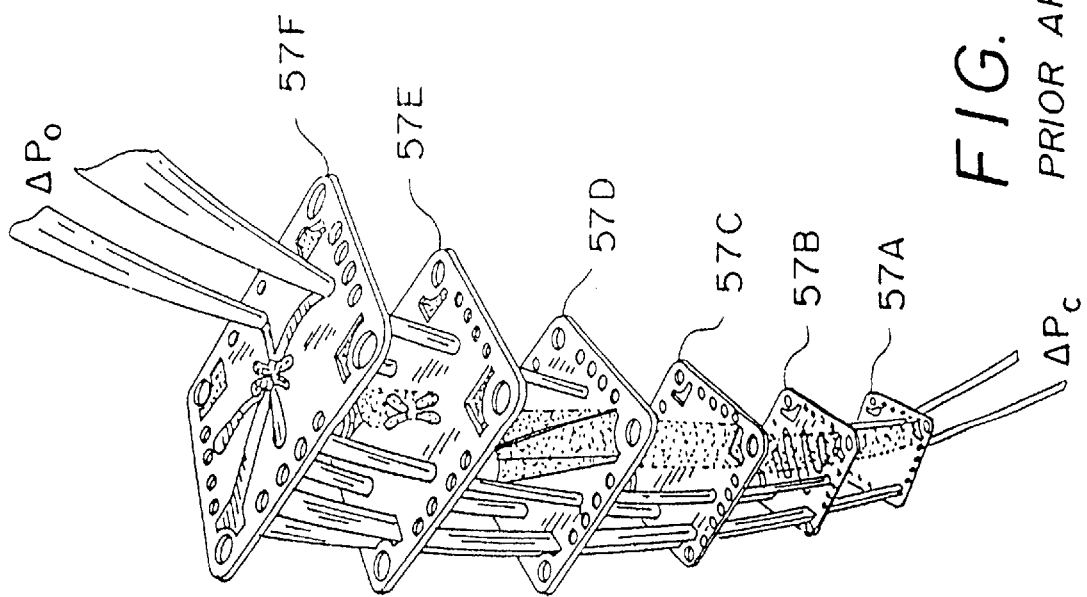
FIG. 2 is an exploded view of a prior art fluidic amplifier module.

As shown in FIG. 2, conventional fluidic amplifier elements are constructed by machining two-dimensional features into thin sheets of material 57A, 57B, 57C, 57D, 57E, and 57F. As shown in FIG. 3, these thin sheets are then brazed or diffusion bonded together to form a fluidic element module 58. With reference to FIGS. 1 and 3, the ball diverter valve 46 is operatively disposed in the flow path between the thrust nozzles 54 and 56 and the output gas paths 42 and 44 by physically machining a cylindrical ball chamber 33 in the laminated fluidic module 58 such that the cylindrical ball chamber 33 breaks through into gas paths 42 and 44 of amplifier 40. The ball 32 is then inserted into the chamber 33 and the chamber 33 closed by caps 60 and 62, which are brazed welded or clamped in place. Caps 60 and 62 house valve seats 50 (not shown) and 52. Accordingly, valve seats 50 and 52 are necessarily oriented 180° apart. Because the prior art diverter valves are machined into the fluidic module after the module has already been laminated together, the post-lamination machining operations add considerable cost. Moreover, because the cylindrical chamber intersects several layers of the laminated stack, it is subject to delamination under the high temperatures and pressures inherent in handling gas generator combustion gas output. Accordingly the cylindrical ball chamber must be overdesigned to accommodate the inherent defects, which adds substantial weight to the assembly.

Figure 4:
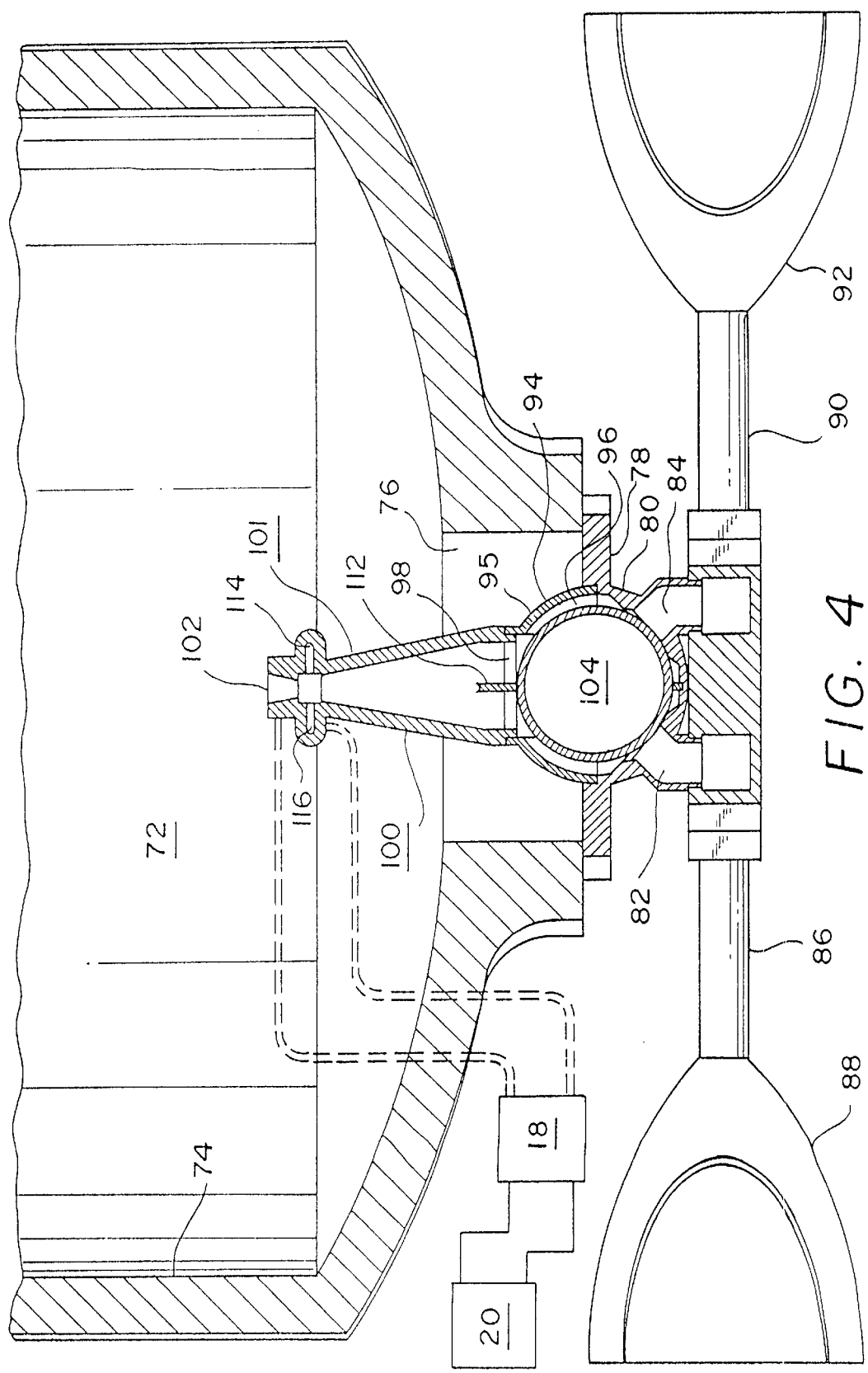
FIG. 4 is a cross section of a flight control system including a fluidic ball diverter valve incorporating features of the present invention.

A flight control system employing a fluidic ball diverter valve 70 incorporating features of the present invention is shown in FIG. 4. A conventional gas generator 72 comprises a pressure vessel 74 for containing the combustion products of a pyrotechnic propellant (not shown). Pressure vessel 74 includes an output opening 76, which is sealed by a sealing flange portion of lower valve body 78. Lower valve body 78 includes a lower wall 80 which is substantially hemispherical in shape and includes outlets 82 and 84. Outlet 82 is in fluid communication with blast tube 86 leading to thrust nozzle 88. Similarly, outlet 84 is in fluid communication with blast tube 90 leading to thrust nozzle 92.

Upper valve body 94 comprises a substantially hemispherical wall 95 which, in cooperation with lower wall 80 defines a substantially spherical ball chamber 96 and which defines an inlet 98 into ball chamber 96. Disposed atop inlet 98 is a conventional non vented fluidic amplifier 100, preferably a bistable amplifier having an inlet 102. The combustion gas products of the gas generator 72 must pass through inlet 102 in order to enter chamber 96 and ultimately exit through either outlet 82 or 84. Disposed within ball chamber 96 is a ball 104, which is substantially solid. The term "solid" as used herein refers to the fact that ball 104 has no intentional fluid passageways through it, as are common in industrial ball valves. The term "solid" is not intended to limit the construction of ball 104 to having a solid core. In fact, depending on the application, ball 104 may be hollow, solid, or have a core that is of a different material from the outer surface.

Figure 5:
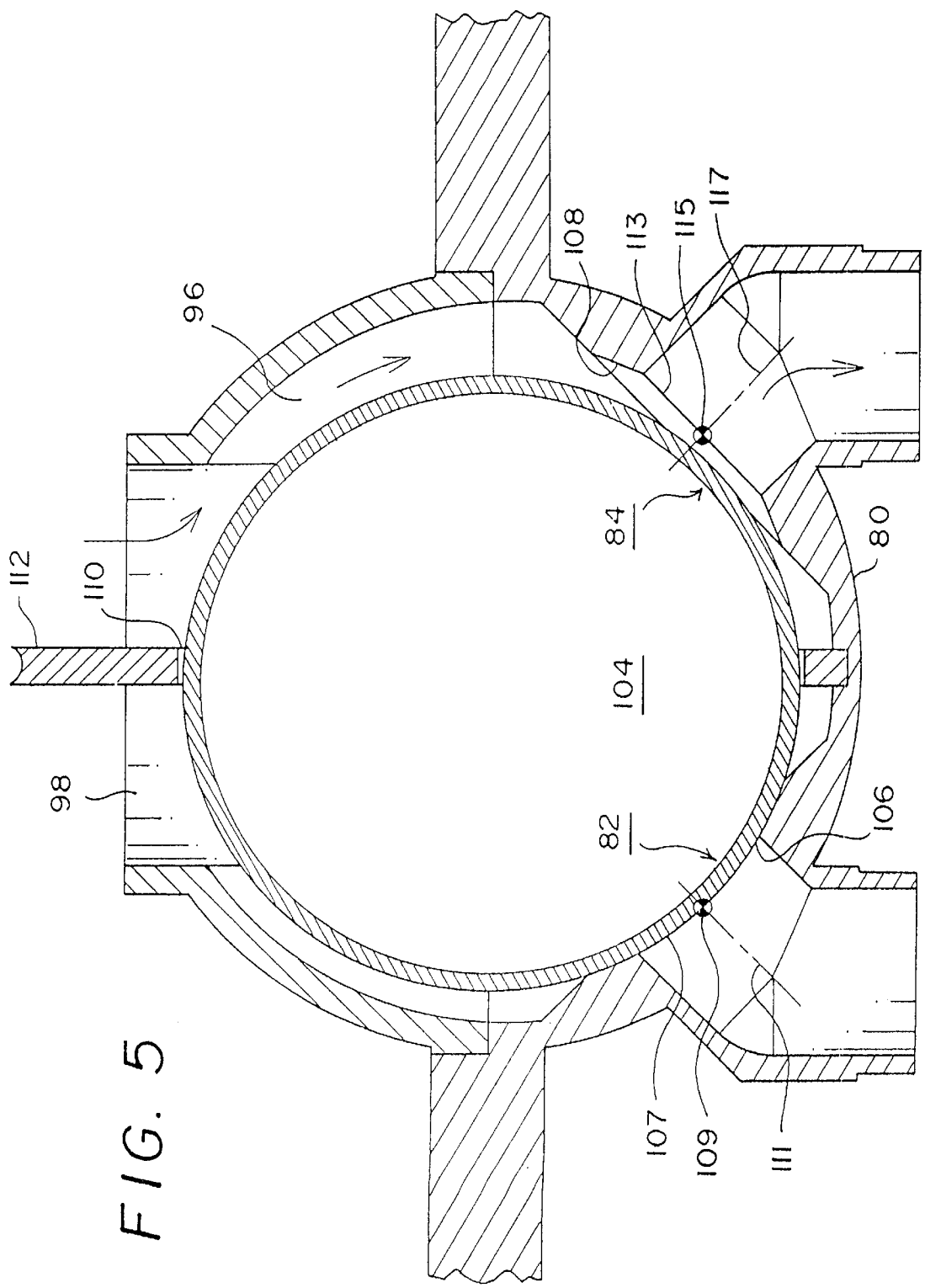
FIG. 5 is an enlarged portion of the cross section of FIG. 4.

As shown more clearly in FIG. 5, outlet 82 terminates at chamber 96 with a valve seat 106 formed into lower wall 80. Valve seat 106 defines an opening 107. Opening 107 has an area centroid 109 and an axis 111 through area centroid 107 normal to the plane of opening 107. Outlet 84 similarly terminates with a valve seat 108 formed into lower wall 80. Valve seat 108 defines an opening 113. Opening 113 has an area centroid 115 and an axis 117 through area centroid 115 normal to the plane of opening 113. In the embodiment of FIGS. 4 and 5, valve seats 106 and 108 are disposed 90 degrees apart, that is, axis 111 intersects axis 117 at an angle of 90 degrees. Other orientations either greater than 90 degrees (but less than the 180 degree orientation of the prior art cylindrical ball valves) or less than 90 degrees are possible. For example orientations of 179 degrees in one degree increments through as close to 0 degrees as can be achieved without causing seats 106 and 108 to break through each other are contemplated within the scope of the present invention.

Ball 104 has a spherical diameter slightly smaller than the diameter of chamber 96, which permits ball 104 to slide alternately from a position in which ball 104 is seated on valve seat 108 obstructing flow into outlet 84 and permitting unobstructed flow through outlet 82 or, as shown in FIG. 5, a position in which ball 104 is seated on valve seat 106 obstructing flow into outlet 82 and permitting unobstructed flow through outlet 84.

Ball 104 moves between the aforementioned first and second positions, while slidingly engaging a cylindrical aperture 110 in a splitter ring 112. Aperture 110 constrains ball 104 to move in a linear path and prevents ball 104 from being unseated in a direction toward inlet 98. Splitter ring 112 also performs the flow splitting function of a flow splitter in a conventional fluidic proportional or bistable amplifier. As can be seen from FIGS. 4 and 5, by eschewing a cylindrical ball chamber, which must have valve seats at opposite ends, in favor of a spherical chamber with valve seats oriented less than 180 degrees apart, the entire diverter valve assembly except lower wall 80 is contained within the gas generator pressure vessel 74. Thus, not only can the components be of lighter construction, but the laminated fluidic module can simply be bonded to the valve chamber without fear of the components separating. Only the lower wall 80 must withstand the full pressure of the gas generator output; and that wall is spherical and therefore inherently more resistant to pressure. Moreover, because the lower wall is not part of the laminated fluidic module assembly, the wall can be made from a solid material, rather than a laminated assembly.

With reference to FIG. 4, in response to a signal from flight electronics 20, a pilot valve 18 or other conventional fluidic device produces a pressure signal which, either directly or after one or more amplification stages, causes a flow in one of two control jets 114 and 116 of fluidic amplifier 100. The flow exiting either jet 114 or 116 impinges the main jet flow entering amplifier 100 through inlet 102 causing the flow path to be diverted either to the left or the right of splitter ring 112 which, in turn causes a pressure differential that urges ball 104 either to the left or the right to seal against the appropriate valve seat.

Figure 6:
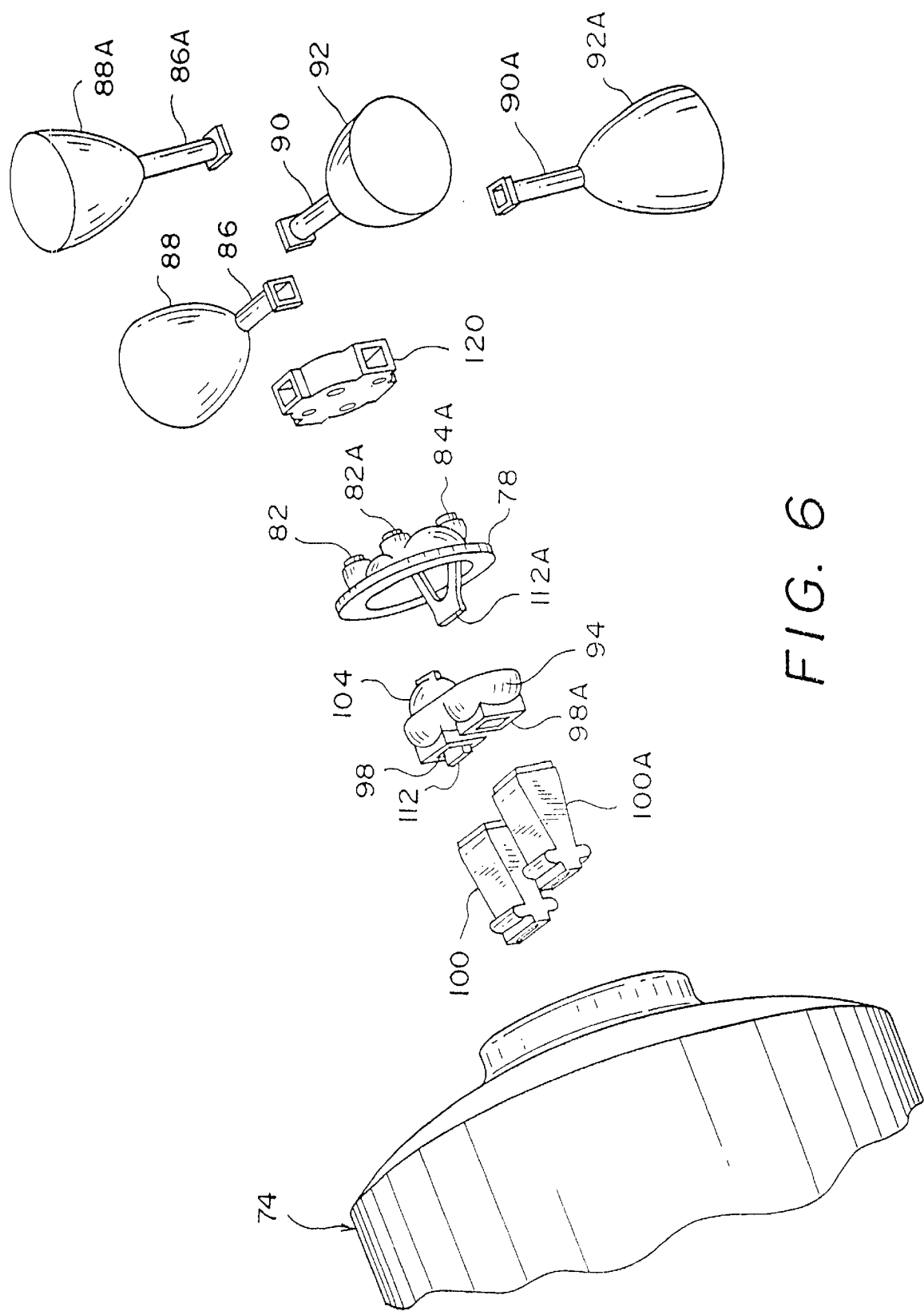
FIG. 6 is a perspective view of a four-quadrant flight control system incorporating features of the present invention.

FIG. 6 is an exploded view of a four quadrant flight control system using two fluidic ball diverter valves incorporating features of the present invention. As can be seen from the exploded view, the ball diverter valve may be assembled by inserting ball 104 into the cylindrical aperture 110 of splitter rings 112 and 112A. Splitter rings 112 and 112A are inserted either into lower body 78 or upper valve body 94 and thereafter lower body 78 and upper valve body 94 are joined together. Fluidic amplifiers 100 and 100A are affixed to inlets 98 and 98A respectively. A four quadrant manifold 120 is joined to outlets 82, 84, 82A and 84A to direct the output into blast tubes 86, 90, 86A and 90A respectively for conveyance to nozzles 88, 92, 88A and 92A.

The components of the ball diverter valve are advantageously made of materials capable of withstanding the high temperature output of the gas generator at the least cost. Accordingly where flight profiles call for warm gas (≦2000° F.) and short flight profiles (<1 second), conventional stainless steel may be used for the housing and other non-moving parts. For longer flight profiles or hotter gas temperatures Inconel, ceramics, or TZM (Titanium Zirconium Molybdenum) are preferred. Where gas temperatures are expected to be in the range of 3700° F., exotic materials such as the element Rhenium are preferred because of their high temperature strength and diffusion bonding capability. Conventional machining operations such as plunge EDM are suitable for forming the aforementioned housing and other non-moving parts. The ball 104 is typically a pure silicon nitride sphere for warm gas applications. For higher temperature applications, a ceramic sphere or a graphite sphere coated with a chemical vapor deposited (CVD) layer of rhenium, typically 0.020 to 0.030 thick is preferred.

The ball diverter valve described above permits the entire laminated fluidic amplifier module and at least a portion of the ball diverter itself to be mounted within the pressure vessel of the gas generator itself By moving these components inside the pressure vessel, the pressure differential experienced by the components is substantially less than if the components were mounted outside the pressure vessel. This permits the components to be of substantially lighter construction. Moreover, to the extent the laminated amplifier module experiences stress caused by a pressure differential, it is a compressive stress caused by the static pressure inside the pressure vessel exceeding the pressure inside the fluidic amplifier passages. Since the stress is compressive, risk of delamination of the assembly is substantially eliminated.

Although certain preferred embodiments and methods have been disclosed herein, it will be apparent from the foregoing disclosure to those skilled in the art that variations and modifications of such embodiments and methods may be made without departing from the true spirit and scope of the invention. For example, although the illustrative embodiment is particularly suited to a maneuvering missiles, other applications in aerospace vehicles including aircraft, satellites and projectiles; and other uses outside the aerospace field where the output of a gas generator, or other source of high pressure fluid, must be controlled, for example inflation of an automotive airbag all are contemplated within the scope of the present invention. Accordingly, it is intended that the invention shall be limited only to the extent required by the appended claims and the rules and principles of applicable law.

What is claimed is:

1. A fluidic ball diverter valve for inclusion within a pressure vessel of a gas generator comprising:

a housing defining a spherical ball chamber inclusion within a pressure vessel of a gas generator;

an inlet in said ball chamber for receiving a flow of fluid;

first and second fluid outlets positioned relative to each other in said housing for directing a fluid flow through said outlets in first and second directions respectively; and a solid ball slideably disposed within said ball chamber and adapted to move translationally between a first position in which said ball obstructs said first outlet while permitting fluid to flow around said ball and through said second outlet and a second position in which said ball obstructs said second outlet while permitting fluid to flow around said ball and through said first outlet;

wherein said first direction projected onto a plane containing said second direction defines an angle less than 180 degrees.

2. The ball diverter valve of claim 1, wherein said first and second axis intersect.

3. The ball diverter valve of claim 2, further comprising:

a fluidic amplifier module comprising a laminated assembly of thin sheets, wherein said fluidic amplifier module is at least partially contained within said pressure vessel.

4. The ball diverter valve of claim 1, further including a pressure vessel providing high pressure fluid output to said inlet of said ball chamber, and wherein said housing defining said ball chamber is at least partially contained within said pressure vessel.

5. The ball diverter valve of claim 1, wherein:

said ball chamber defines a substantially spherical cavity.

6. The ball diverter valve of claim 1, wherein:

said first outlet comprises an opening having a circular cross section and said first area centroid comprises the center of said circular cross section.

7. The ball diverter valve of claim 1, wherein:
said second outlet comprises an opening having a circular cross section and said second area centroid comprises the center of said circular cross section.

8. The ball diverter valve of claim 1, further comprising:
a splitter ring, said splitter ring comprising a thin sheet disposed within said ball chamber defining a plane generally parallel to a flow of fluid entering said ball chamber through said inlet, said splitter ring further including a cylindrical aperture transverse to said plane adapted to constrain said ball to move translationally within said chamber.

9. The ball diverter valve of claim 8 wherein the housing comprises a metal selected from the group consisting of Inconel, ceramics, or Titanium Zirconium Molybdenum.

10. The ball diverter valve of claim 9, wherein the housing comprises Rhenium.

11. The ball diverter valve of claim 9 wherein the ball comprises silicon nitride.

12. The ball diverter valve of claim 1 wherein the ball comprises a graphite sphere coated with a chemical vapor deposited (CVD) layer of rhenium, in a thickness in the range of 0.020 to 0.030 inches.

13. A gas generator flow control apparatus for use with a gas generator having a pressure vessel and providing a combustion gas output, said flow control apparatus, comprising:
a fluidic amplifier module disposed within said pressure vessel having an inlet in fluid communication with said gas generator combustion gas output and having a plurality of outlets, said fluidic amplifier module being responsive to an external signal for diverting a portion of said combustion gas output to one of said plurality of outlets, said fluidic amplifier module comprising a laminated assembly of thin sheets wholly disposed within said pressure vessel; and
a fluidic ball diverter valve comprising a ball chamber at least partially disposed within said pressure vessel and in fluid communication with at least two of said plurality of outlets, said fluidic ball diverter valve having a plurality of outlets external to said pressure vessel.

14. The ball diverter valve of claim 13, wherein:
said ball chamber defines a substantially spherical cavity.

15. The ball diverter valve of claim 13, further comprising:
a splitter ring, said splitter ring comprising a thin sheet disposed within said ball chamber defining a plane generally parallel to a flow of fluid entering said ball chamber through said inlet, said splitter ring further including a cylindrical aperture transverse to said plane adapted to constrain said ball to move translationally within said chamber.

16. The ball diverter valve of claim 15, further comprising:
an electronic controller adapted to receive flight environment information and provide a flight control signal to said fluidic amplifier module in response thereto.

17. A self-maneuvering aerospace vehicle comprising:
a vehicle adapted to move in an aerospace environment;
an electronic controller adapted to receive flight environment information for said vehicle and providing flight control signals in response thereto;
a gas generator for providing a combustion gas output;
a fluidic amplifier in fluid communication with said gas generator and responsive to said flight control signals for diverting a portion of said combustion gas output to one of a plurality of maneuvering jets operatively attached to said vehicle;
a ball diverter valve operatively disposed between said fluidic amplifier and said plurality of maneuvering jet for enhancing flow diversion of said fluidic amplifier, said ball diverter valve comprising:
a housing defining a ball chamber;
an inlet in said ball chamber for receiving a flow of fluid;
a first outlet defining an opening in said ball chamber having a first area centroid and a first axis, said first axis comprising an axis through said first area centroid normal to a plane across said outlet;
a second outlet defining an opening in said ball chamber having a second area centroid and a second axis, said second axis comprising an axis through said second area centroid normal to a plane across said outlet, and
a solid ball slideably disposed within said ball chamber and adapted to move translationally between a first position in which said ball obstructs said first outlet while permitting fluid to flow around said ball and through said second outlet and a second position in which said ball obstructs said second outlet while permitting fluid to flow around said ball and through said first outlet;
wherein said first and second outlets are positioned in said ball chamber such that a projection of said second axis onto a plane containing said first axis passing through said second area centroid defines an angle less than 180 degrees.

* * * * *